W. W. HASKELL.
ATTACHMENT FOR EVENERS.
APPLICATION FILED FEB. 18, 1919.
1,320,229.
Patented Oct. 28, 1919.
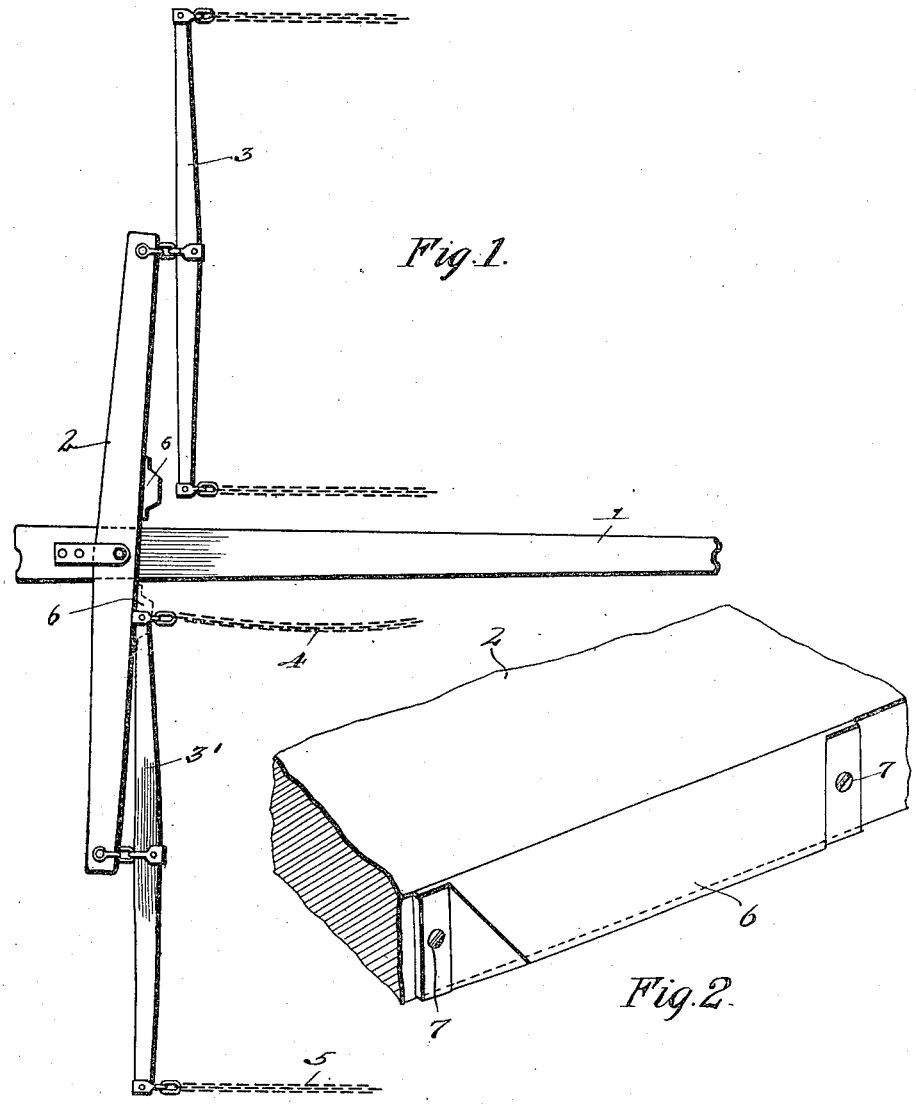
WITNESSES:
INVENTOR
William W. Haskell
BY
Victor J. Evans
ATTORNEY

UNITED STATES PATENT OFFICE.

WILLIAM W. HASKELL, OF ORD, NEBRASKA.

ATTACHMENT FOR EVENERS.

1,320,229.  Specification of Letters Patent.  Patented Oct. 28, 1919.

Application filed February 18, 1919. Serial No. 277,707.

*To all whom it may concern:*

Be it known that I, WILLIAM W. HASKELL, a citizen of the United States, residing at Ord, in the county of Valley and State of Nebraska, have invented new and useful Improvements in Attachments for Eveners, of which the following is a specification.

This invention relates to an attachment for eveners, and the object of the invention is to provide means for preventing the draft being unequally distributed on the horses.

In carrying out my invention I provide means for preventing the inner end of the whiffletree from bearing against a part of the evener, which would cause the lagging horse to carry but a small part of the load.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a plan view showing the positions of the parts when the inner end of one tree lodges against the evener.

Fig. 2 is a perspective view of one of the blocks.

In these views, 1 indicates the pole of the wagon or other vehicle, 2 the evener and 3 and 3' the whiffletrees. As shown in Fig. 1, when one horse is lagging the inner end of his tree 3' will lodge against the evener so that the inner trace 4 will become slack and the whole pulling force is on the outer trace 5. This action throws most of the load on the other horse, as the tree 3' forms an extension of the evener with one horse pulling on the short part and the other horse pulling on the long part.

In carrying out my invention, I place a pair of wedge-shape blocks 6 on the evener, one on each side of the pole, and so located that the inner end of the trees will strike the blocks when they swing back into the position shown in Fig. 1. As the ends of the trees strike the wedge-shape blocks they will be deflected either upwardly or downwardly and thus caused to pass the evener and not lodge thereagainst. In this way, the lagging horse must pull his part of the load.

As shown in Fig. 2, each of the blocks is formed with a flat side to bear against the evener, and its ends are extended and provided with the holes 7 for receiving screws or the like for securing the blocks to the evener. The upper and lower sides converge to form the deflecting parts for the trees.

What I claim is:—

1. An attachment for eveners, comprising a wedge-shape block and means for securing the same to the evener.

2. An attachment for eveners, comprising a wedge-shape block having perforated extending portions on its ends for receiving the securing means for attaching the same to the evener.

3. In combination with an evener and the whiffletrees, a block of wedge-shape, secured to the evener on each side of the tongue, for preventing the inner ends of the trees from lodging against the evener.

In testimony whereof I affix my signature.

WILLIAM W. HASKELL.